(12) United States Patent
Rice

(10) Patent No.: US 11,137,015 B2
(45) Date of Patent: Oct. 5, 2021

(54) PRECISION TORQUE CONTROL POSITIVE LOCK NUT

(71) Applicant: Donald Wayne Rice, Ripley, NY (US)

(72) Inventor: Donald Wayne Rice, Ripley, NY (US)

(*) Notice: Subject to any disclaimer, the term of this patent is extended or adjusted under 35 U.S.C. 154(b) by 0 days.

(21) Appl. No.: 15/906,549

(22) Filed: Feb. 27, 2018

(65) Prior Publication Data

US 2021/0071705 A1 Mar. 11, 2021

(51) Int. Cl.
| | |
|---|---|
| *F16B 39/08* | (2006.01) |
| *F16B 39/12* | (2006.01) |
| *F16B 39/20* | (2006.01) |
| *F16B 37/12* | (2006.01) |

(52) U.S. Cl.
CPC ............ *F16B 39/128* (2013.01); *F16B 37/12* (2013.01); *F16B 39/08* (2013.01); *F16B 39/20* (2013.01)

(58) Field of Classification Search
CPC .......... F16B 39/04; F16B 39/08; F16B 39/10; F16B 39/128; F16B 39/20; F16B 37/12; F16B 37/125
USPC .......................... 411/209, 212, 213, 438, 178
See application file for complete search history.

(56) References Cited

U.S. PATENT DOCUMENTS

| | | | | | |
|---|---|---|---|---|---|
| 1,787,114 | A | * | 12/1930 | Lelean ................... | F16B 39/08 411/213 |
| 2,365,433 | A | * | 12/1944 | Polizzi ................... | F16B 39/08 411/320 |
| 3,129,742 | A | * | 4/1964 | Gunther ................. | F16B 39/04 411/213 |
| 5,080,544 | A | * | 1/1992 | Bruyere ................. | F16B 39/10 411/120 |
| 5,360,303 | A | * | 11/1994 | Behrens ................. | F16B 39/08 411/120 |
| 6,494,659 | B1 | * | 12/2002 | Lutkus ................... | F16B 37/12 411/438 |
| 6,726,422 | B2 | * | 4/2004 | Giannakakos .......... | C22C 14/00 411/178 |
| 9,845,822 | B2 | * | 12/2017 | Pailhories .............. | F16B 39/04 |
| 2004/0120789 | A1 | * | 6/2004 | Masuda ................. | F16B 37/122 411/178 |

* cited by examiner

*Primary Examiner* — Flemming Saether
(74) *Attorney, Agent, or Firm* — Dawsey Co., LPA; David J. Dawsey

(57) ABSTRACT

A combination positive locking and prevailing torque fastener system including a fastener nut, a helical wire insert, a nut cap, and a shaft. The nut cap is longitudinally movable from an engaged position to a disengaged position such that in the engaged position the fastener nut and the nut cap are rotationally locked, and in the disengaged position the nut cap rotates independent of the fastener nut.

16 Claims, 15 Drawing Sheets

PRECISION TORQUE CONTROL POSITIVE LOCK NUT

CROSS-REFERENCE TO RELATED APPLICATIONS

This Application claims priority to U.S. patent application Ser. No. 15/595,620, filed May 15, 2017, to U.S. Provisional Patent Application Ser. No. 62/553,190, filed Sep. 1, 2017 and to U.S. Provisional Patent Application Ser. No. 62/414,423, filed Feb. 28, 2017, the disclosures of which are hereby incorporated by reference.

STATEMENT REGARDING FEDERAL GRANTS

Not Applicable.

BACKGROUND OF THE INVENTION

The present disclosure relates to a positive torque locked nut and fastener system with a longitudinally serrated lock nut and removable cap that is used as part of a fastener system to lock a fastener in place. In a preferred embodiment, the locking feature fastener system is utilized in vehicles, such as in aircraft. In an alternative embodiment a helical wire insert is used in conjunction with a dissimilar material to form the locking fastener, such as a polymer fastener body with a steel alloy helical thread system.

Locking fasteners are widely used in attaching equipment to an aircraft fuselage, and for other installations in vehicles, such as cars, agricultural equipment, construction equipment, railroad equipment and the like. In particular, aircraft jet engines are often attached to the airframe with barrel nuts that include a locking feature. Rotating shafts are commonly secured with a positive locking fastener, such as with a cotter pin. In addition, the same or similar fasteners are used in a variety of situations, such as industrial equipment, farm equipment and other equipment where vibration and motion control is required.

Castellated nuts and a compatible cross bore on a threaded shaft have been commonly used for some time to lock a shaft in position by insertion of a pin, (such as a cotter pin), a wire insert, or both. For instance, alternatively, a nut can have a pressed steel castellated cap placed over the nut, and the crennelations in the cap are aligned with a cross bore in the shaft.

Prevailing torque locking fasteners are available that provide for a prevailing torque lock through use of a disk of resilient material. For instance, Vespel™ inserts are made from a polymide material and are often used with locking or self-locking fasteners. Currently available fastener systems are generally less than fully acceptable because the available locking inserts are expensive and installation of a disk for a locking insert, such as a Vespel™ insert, is often difficult. Commonly Dupont Vespel SP polymide components are machined or cut into a disk shape and then inserted as a collar around a fastener nut. An additional difficulty in using such inserts is that the bolt fasteners must be driven into the insert to maintain the specified torque tolerance even when used in an environment that imposes a wide range of temperatures and vibration patterns.

Locking fasteners which use inserts such as resilient inserts formed of Vespel™ have many limitations. Importantly, such inserts are expensive, as the plastic material must be approved by OEM users and the proprietary material in Vespel™ cannot be substituted by unapproved alternatives from third parties. The use of resilient inserts also has many issues such as a) the inserts are easily-damaged during installation b) the inability to reuse resilient inserts for reinstallation of components, and c) the limitation to the shape of fasteners when using a resilient collar. These current systems are generally limited, and could be substantially improved with an alternative substitute to a resilient insert locking fastener. Another disadvantage of existing systems is the limited number of cycles of insertion and removal that are within specified limits. Furthermore, there is an undesired inconsistency between locking torque values between the early cycles of use, and when the fastener is finally replaced.

Other previous attempts in the aircraft industry to improve on locking fasteners have resulted in a variety of fasteners, each of which have certain limitations. For example, U.S. Pat. No. 5,127,782 issued Jul. 7, 1992 discloses a fastener system as a self locking castellated nut. For instance, the Shur-Lok "Sta-Lok" (T) system is approved for use in aircraft such as helicopters, and utilizes a series of small serrations to hold a fastener nut in place after being torqued to a give specification. For purposes of reliability and safety a positive locking mechanism is considered important, and in some situations essential.

An improved fastener system is desired by manufacturers and retrofitters to reduce the cost of current fasteners, and it is also desirable to enable labor savings along with improved assembly processes, and improved maintainability, reparability, overhauling, fastener reliability and strength.

BRIEF DESCRIPTION OF THE DRAWINGS

For a fuller understanding of the nature and advantages of the present invention, reference should be had to the following detailed description taken in connection with the accompanying drawings, in which.

SUMMARY OF THE INVENTION

Figure 1A:
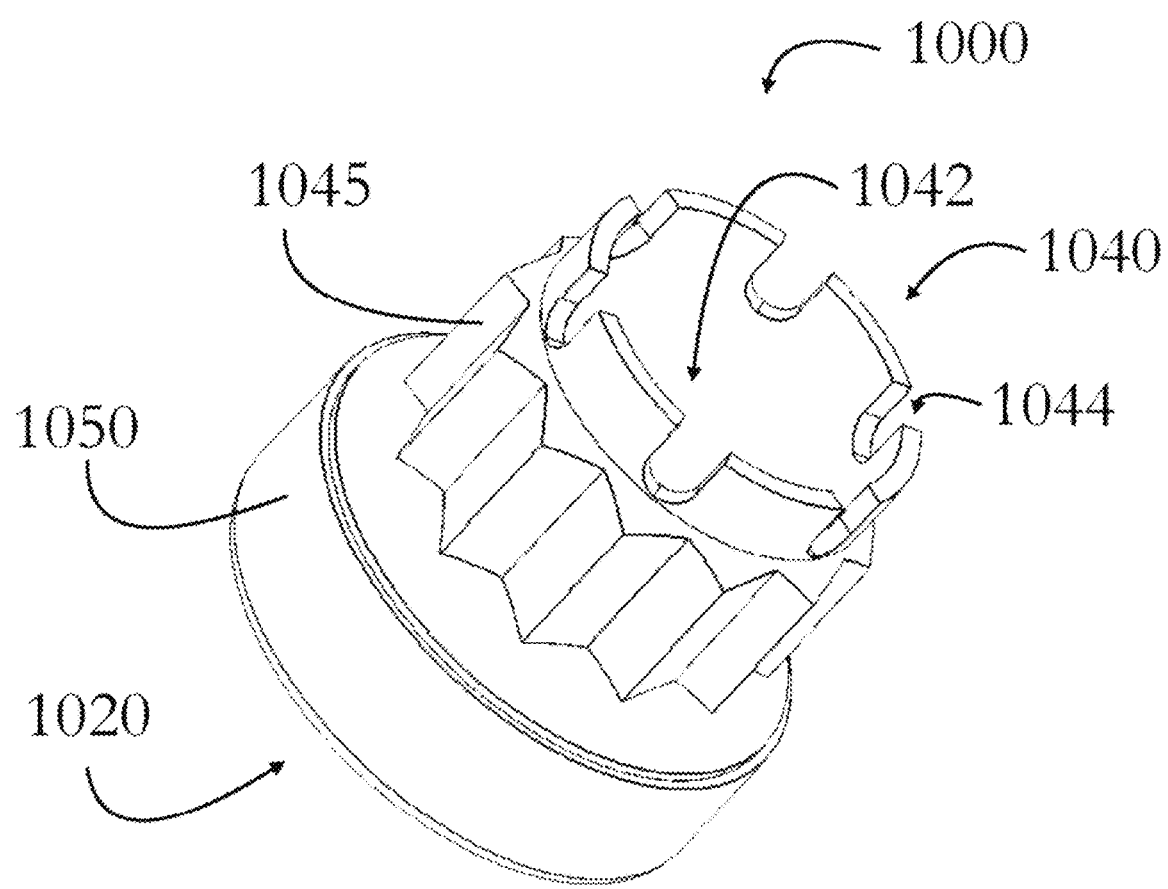
FIG. 1A shows an overhead assembled perspective view of a torque control locking fastener.

The invention is embodied in a positive locking fastener system comprising a) a fastener with a thread bore internally threaded to accept a helical wire insert; b) a helical wire insert with an external thread that mates with the internal threads of the thread bore, and internal threads that are compatible with a shaft; c) the shaft being externally threaded and capable of being driven by a given torque into the helical wire insert, with the helical wire insert resisting the backing out of the driven insert with a torque greater that the given torque for driving the threaded shaft into the helical wire insert; d) the exterior of the fastener nut longitudinally serrated to accept a compatibly longitudinally serrated castellated cap; and e) a castellated cap that will accept a locking insert to positively prevent movement of the torqued nut, whereby the helical wire insert serves to lock the fastener at a location determined by the given torque and resist backing out of the threaded shaft, and the positive lock allows for precise torque application to a nut.

It is a further embodiment that the fastener further comprises a shaft that is a bolt or a stud. The fastener may further comprise a helical wire insert that occupies only a portion of the thread bore. The fastener may be embodied as a barrel nut or as a bearing nut.

There is another embodiment as a method of attaching a component comprising providing a fastener that includes a fastener with a thread bore internally threaded to accept a helical wire insert; a helical wire insert with an external thread that mates with the internal threads of the thread bore, and internal threads that are compatible with a shaft; the shaft being externally threaded and capable of being driven by a given torque into the helical wire insert, with the helical wire insert resisting the backing out of the driven insert with a torque greater that the given torque for driving the threaded shaft into the helical wire insert, whereby the helical wire insert serves to lock the fastener at a location determined by the given torque and resist backing out of the threaded shaft.

In yet another embodiment the disclosure describes a positive locking fastener system comprising a) a fastener nut with a thread bore internally threaded to accept a shaft; b) an externally threaded shaft compatible with the thread bore threads and capable of being driven by a given torque for driving the threaded shaft into the fastener; c) the exterior of the fastener nut longitudinally serrated to accept a compatibly longitudinally serrated castellated cap; and c) a castellated cap that will accept a locking insert to positively prevent movement of the torqued fastener nut, whereby the locking insert serves physically block rotation of the fastener about the shaft and thereby lock the fastener at a location determined by the given torque and the positive lock allows for precise torque application to a nut.

In yet another embodiment the fastener further comprises a shaft that is one of a rotating shaft, a stationary shaft, a bolt or a stud. The fastener of may yet, further comprise two or more tabs forming lock slots on the cap. And the fastener may be embodied as a bearing fastener.

DETAILED DESCRIPTION OF THE INVENTION

Disclosed herein is a new apparatus and associated method for securing equipment to an underlying structural support. In particular, disclosed is a locking fastener useful for attaching components in vehicles, engines and the like to structural members, where attachments may be subject to vibrational loosening.

As disclosed herein such fastener typically is configured to accept a male fastener, and provide for a desired set of torque tolerances including locking, unlocking, and during installation or removal.

FIG. 1 shows an assembly and an exploded perspective views of a locking fastener that provides an integrated retaining cap and allows for precise control of the applied torque and locking in a preferred position. Such a fastener can be provided with or without an optional helical thread insert (HTI) that can provide for improved thread characteristics or additionally, a prevailing torque feature. The fastener 1000 shown in FIG. 1 is preferentially embodied as a serrated nut with integrated cap. Fastener 100 is essentially comprised of a nut body and a nut cap. Fastener 1000 has an externally circular shape with externally disposed longitudinal serrations on the exterior perimeter of the nut body (hidden in FIG. 1A). A nut cap 1040 is provided with internally disposed serrations compatible with the external perimeter serrations of the nut body.

As shown in FIG. 1A nut cap 1040 nests inside cap retainer 1050. The nut cap is provided with a series of crenellations, or notches 1044, which allow for a retainer such as a pin or wire to pass through a cross bore in an inserted shaft and lock the nut in position relative to the shaft. The nut cap provides a wrenching interface 1045, shown in the embodiment in FIG. 1A as a twelve point nut body. Those skilled in the art will recognize that other nut shapes are applicable to the disclosure. The nut is formed with a shaft bore, 1040, a portion of which will be formed as a thread bore. The thread bore is later tapped to conform to the desired thread pattern. Threads 1020 can be directly cut in a desired thread form or alternatively formed with screw thread insert threads, or STI threads, which produce a larger than nominal hole to accommodate a helical thread insert.

Figure 1B:
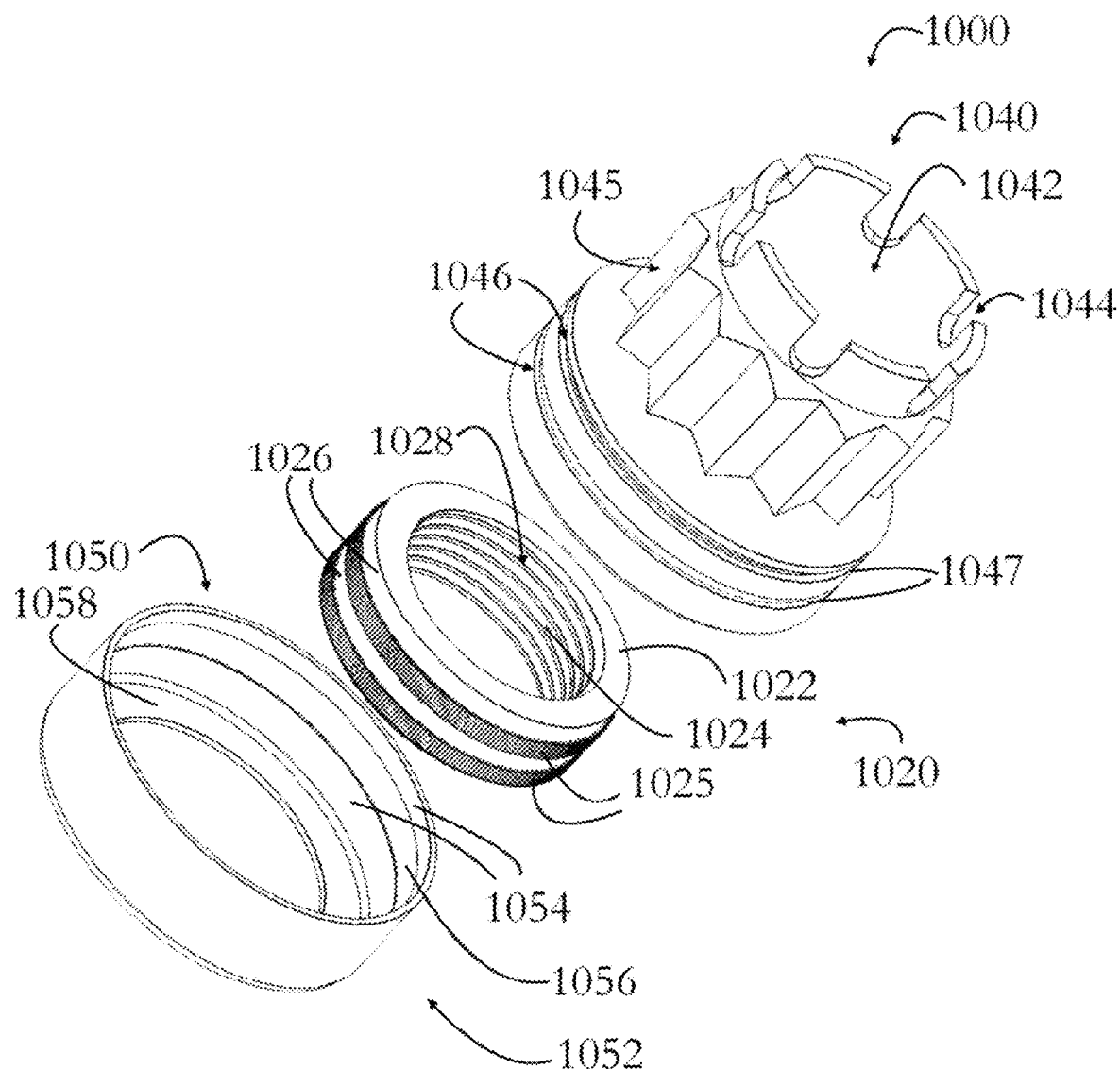
FIG. 1B shows an exploded view of a torque control locking fastener.

FIG. 1B shows an exploded perspective view of fastener 1000. Nut 1020 has a generally cylindrical nut body, with an internal bore with threads 1024. Threads 1024 are shown as integrally formed, although STI thread or the like can be provided to allow installation of a helical thread insert. The exterior surface of the nut body is formed with a series concentric serration 1026, shown as two rings of serrations in FIG. 1B, and separated by clear rings 1025. Nut cap 1040 has compatible serrations on the internal surface, so that the internal serrations of nut cap 1040 engage with the external serrations of nut body 1020.

The nut cap has concentric channels 1047 that hold rings 1046. Retainer cup 1050 has compatible rings that allow for the nut cap to be rotated relative the nut body.

As a bolt is inserted into the assembled locking fastener, such as fastener 1000, rotation of the bolt engages helical insert portion 1030, and expands the helical insert to bear against the inner surface of the thread bore body 1010. As the bolt advances into the helical insert, additional segments of the helical insert are expanded and bear against the thread bore body. In one embodiment, the bolt is advanced entirely through the helical insert and thread bore body, and is finally torqued to a specified torque. In such case, the characteristics of the helical insert will serve to retain the bolt in position and resist any backing-out of the bolt to a reverse torque specification determinable according to the characteristics of the helical insert. Properly installed, the helical insert will bear against both the bolt and the thread bore body, retaining the inserted bolt.

In an alternative embodiment, the bolt is inserted only a portion of the depth of the helical insert, and the portion of the helical insert that is bearing against the bolt and the thread bore body will retain the bolt to a determinable reversing torque. A variety of such specifications and applications are provided by the manufacturer of helical wire inserts, such as from Kato Fastening Systems, Inc.

As described in regards to FIG. 1, previous castellated nuts and bearing nuts (for instance) provided with a pressed steel nut cap bearing castellations, utilized the "serration" in the form of the nut exterior perimeter, typically with six points, or possible also eight or twelve points. The nut cap very commonly was provided with either six or twelve notches. As described herein, the term serration refers to a uniform series of notches, indentation or tooth pockets, so that rotation of a nut and nut cap allows for continual matching of compatible serrations, i.e. teeth and notches. As shown in regards to FIG. 1 the distance between successive teeth around the circumferential perimeter of a nut is preferably about 1 mm, or about 2 mm. It is preferred that successive teeth be spaced less than about 5 mm apart.

By providing a series of compatible teeth and notches, it is thus not necessary to deviate from a preferred torque on the installed nut. The ease of the rotation of the nut cap to align a cross bore in a shaft with a castellation in the nut cap allows for the preferred torque to be applied to the nut during installation, and then no backing off of the nut is necessary to install the lock (whether key, cotter pin, or wire) though the nut cap and the shaft cross bore.

A further improvement of the fastener is to install a helical thread insert in the thread bore of the nut. Such a helical thread insert (HTI) can be either a locking (prevailing torque) or free running insert. Helical inserts have been used for some time in industry for applications that substantially differ from those disclosed, including, for instance, as a means to repair damaged threads. Helical coil inserts are helically-wound inserts that function in fasteners to provide durable screw threads. Kato brand "CoilThread"™ Inserts are made of cold-rolled No. 304 stainless steel wire (AS7245), work-hardened to a tensile strength above 200,000 psi, and a hardness of Rc 43-50. KATO CoilThread inserts are available in a variety of wound thread sizes including Unified Coarse (UNC), Unified Fine (UNF) and Metric thread sizes. As such the preceding are only some of the variety of helical coil inserts. When helical coil inserts are assembled in "STI" (Standard Thread Insert) tapped holes, Helical coil inserts form standardized Unified Coarse (UC) or Unified Fine (UF) threads that conform to National Bureau of Standards Handbook H-28, and meet screw thread standards according to U.S. Federal classification. Helical coil inserts can also be produced that fit a variety of thread standards, such as for instance, will also accommodate UNJ, MIL-S-8879, and male threaded fasteners. Further examples are shown in the 2015 CoilThread Inserts and Tools product catalog of Kato Fastening Systems, Inc. of Newport New, Va.

Figure 2A:
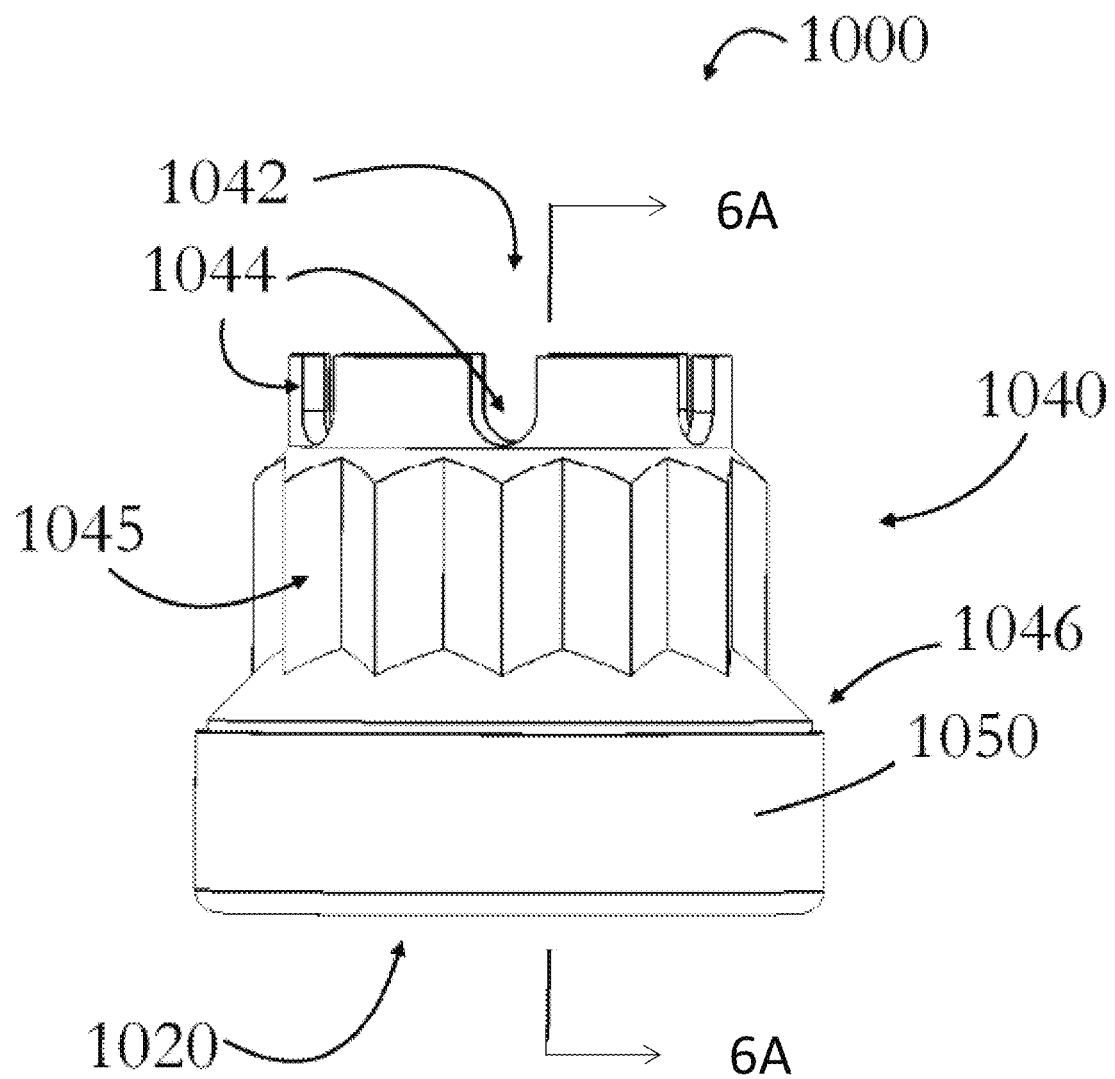
FIG. 2A shows alternative side elevation views of a toque control locking fastener.
Figure 2B:
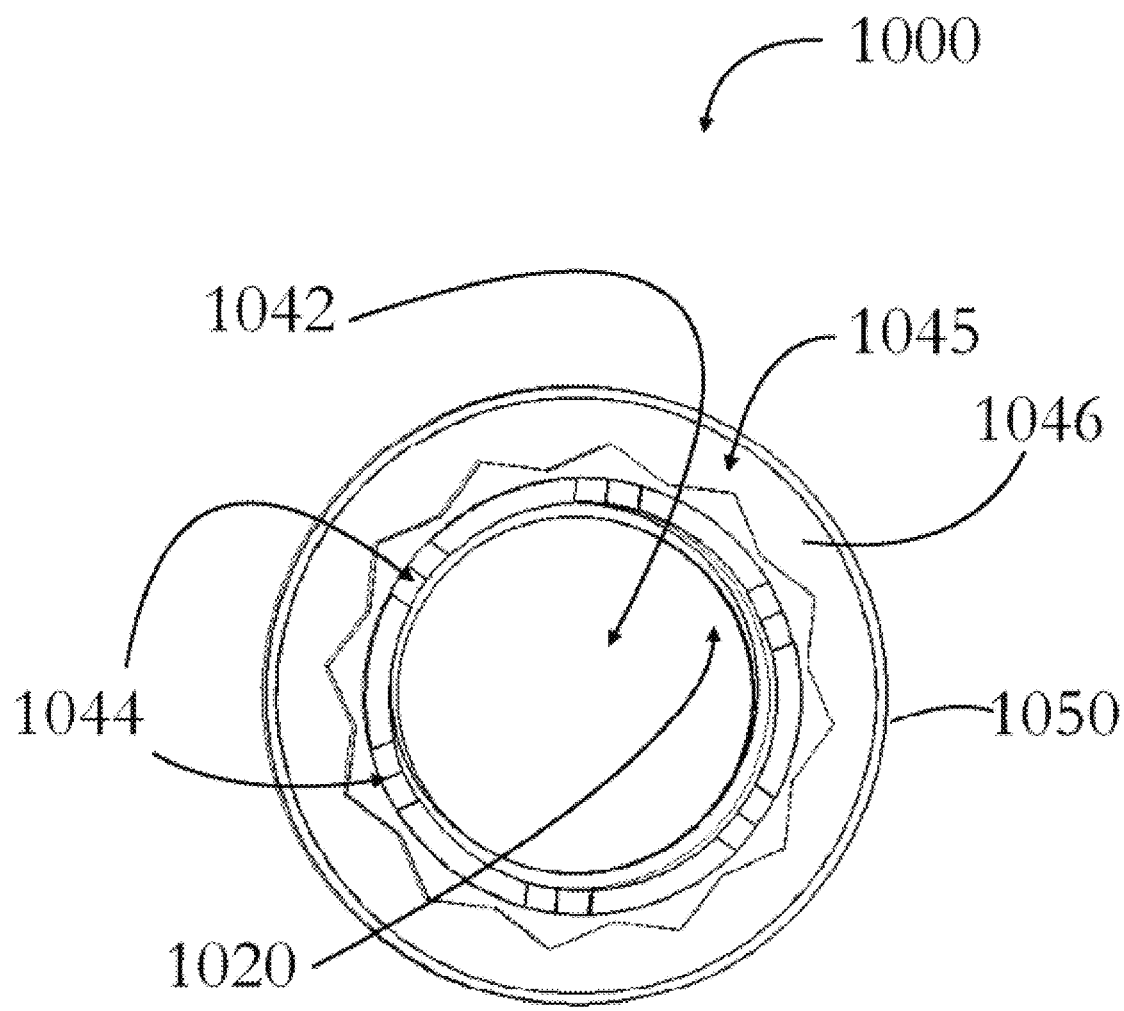
FIG. 2B shows a top plan view of a toque control locking fastener.
Figure 2C:
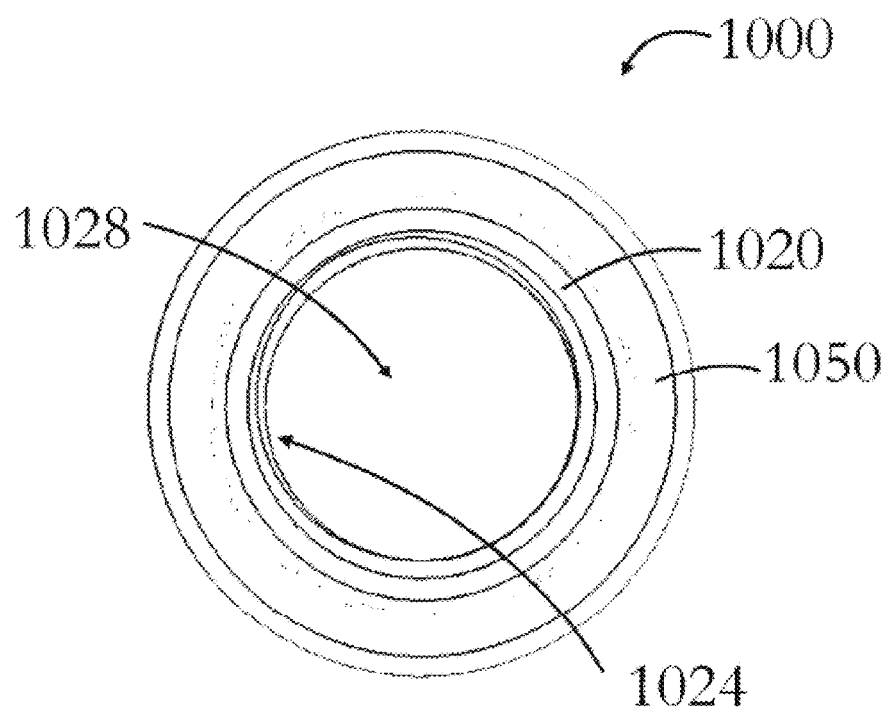
FIG. 2C shows a bottom plan view of a toque control locking fastener.

FIG. 2 shows three directional views of the fastener shown in FIG. 1. FIG. 2A shows a side view of fastener 1000. FIG. 2B shows a top view, revealing the threadbare 1020 a perspective view of a locking fastener with a helical insert, embodied as a serrated nut, such as that shown in FIG. 1. Nut cap 1040 nests inside concentric cap retainer 1050. The nut cap is provided with a series of notches 1044, nut cap provides the wrenching interface 1045, The nut is formed with a shaft bore, 1042, a portion of which will be formed as a thread bore lined with threads 1024. Threads 1024 can be formed to fit typically desired standard thread, for example, UNF threads. FIG. 2C shows a bottom view of the fastener 1000. Nut 1020 has a generally cylindrical nut body, with an internal bore with threads 1024. Threads 1024 are shown as integrally formed, although STI thread or the like can be provided to allow installation of a helical thread insert. Retainer cap 1050 has compatible rings that allow for the nut cap to be rotated relative the nut body.

Figure 3A:
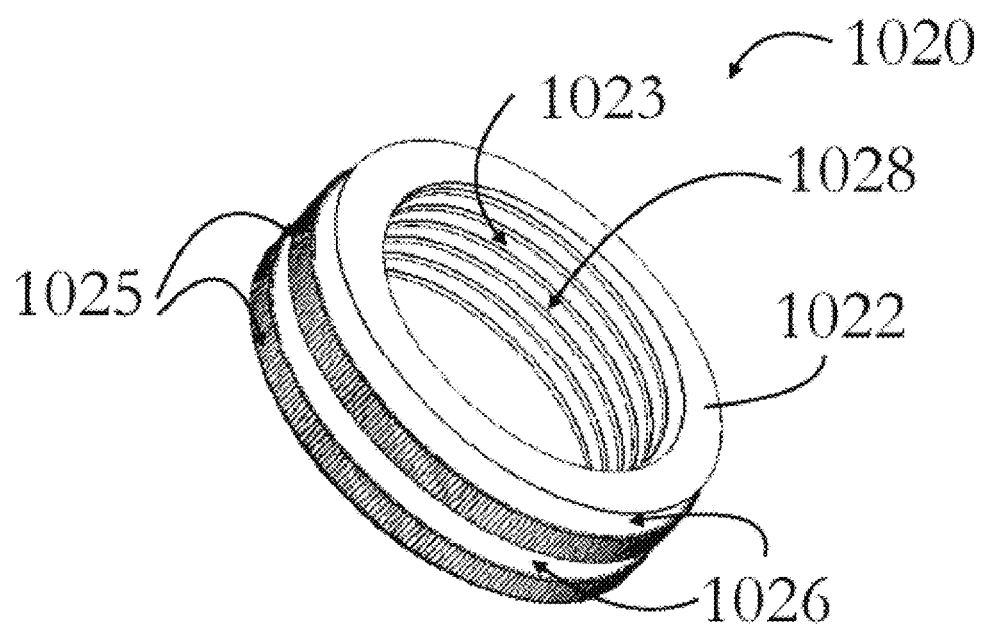
FIG. 3A shows a perspective view of a serrated nut body for use with the fastener system.
Figure 3B:
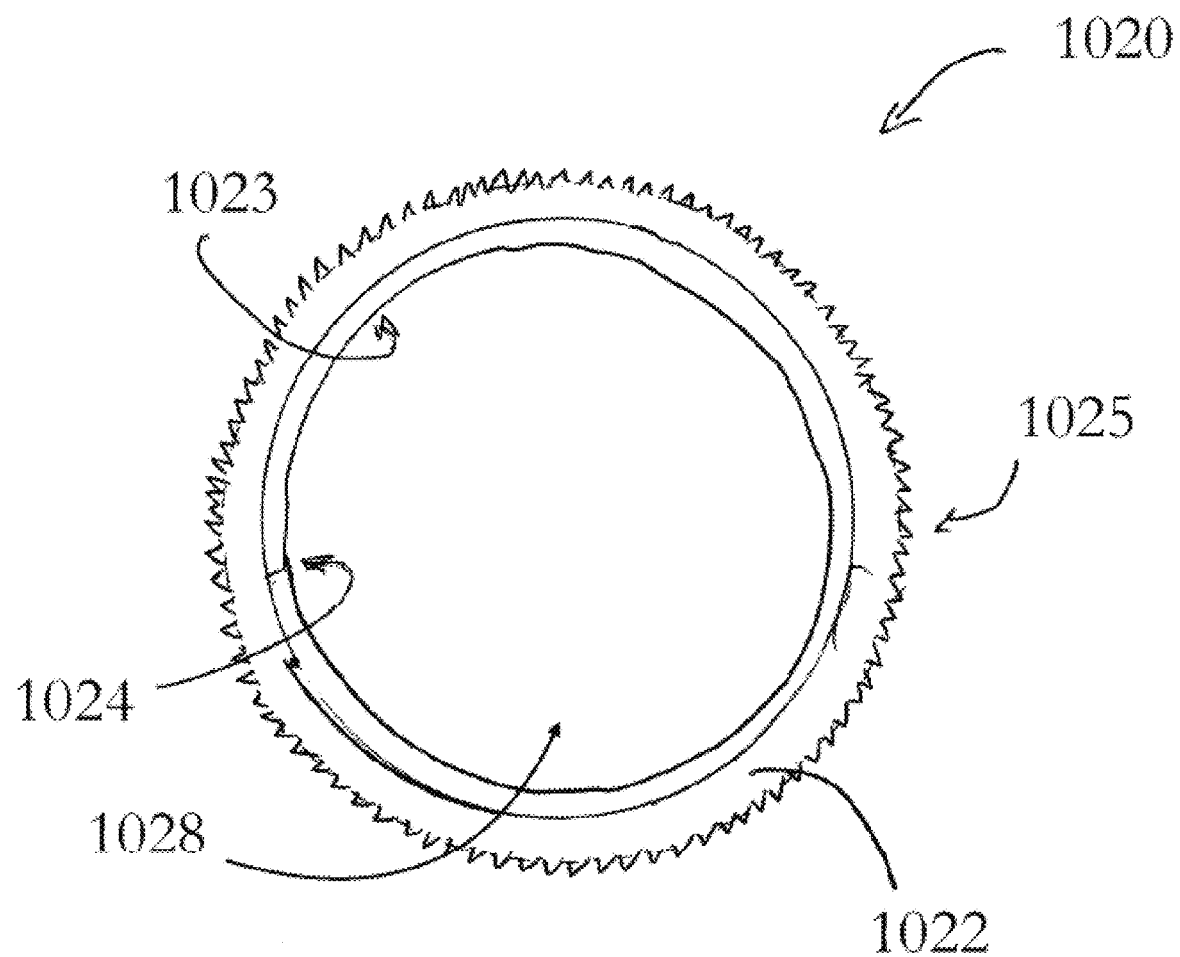
FIG. 3B shows a top plan view of a serrated nut body for use with the fastener system.
Figure 3C:
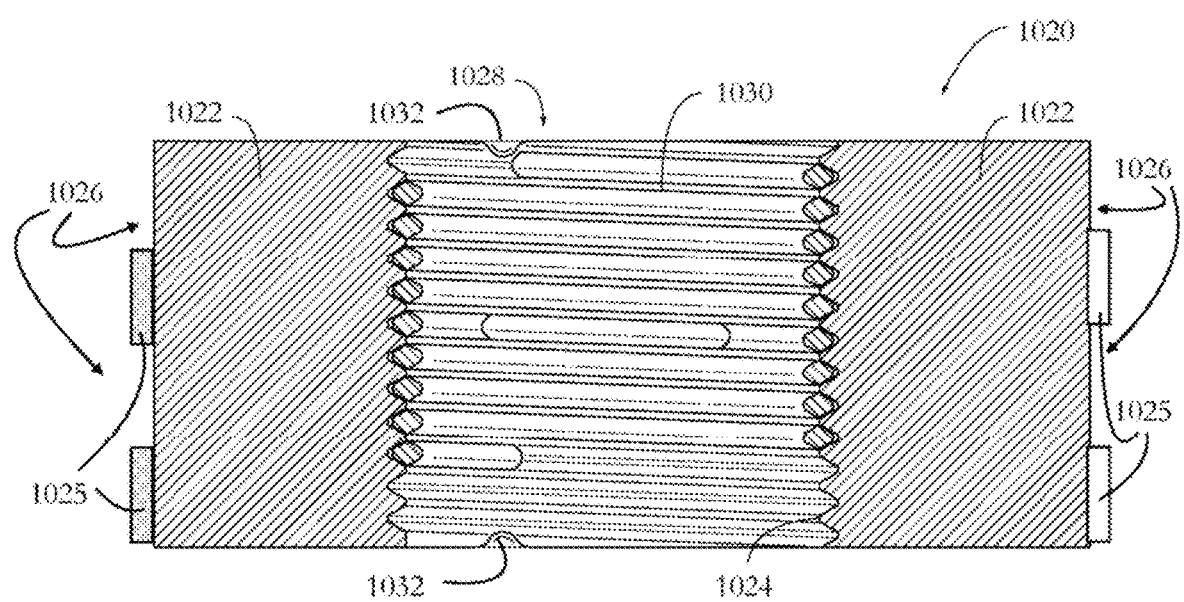
FIG. 3C shows a cross-sectional view of a serrated nut body for use with the fastener system.

FIG. 3 shows detailed views of nut 1020. In FIG. 3A, threads 1024 of nut body 1022 line the thread bore 1028. Nut body 1022 is provided with two rings 1025 of locking serrations, or teeth and notches around the nut body perimeter. These rings are separated by smooth rotation rings 1026. The rotation rings are slightly smaller diameter than the locking serration rings, so that when the nut cap serration rings are aligned with the nut body rotation rings, the nut cap can be rotated. FIG. 3B shows a top view of nut 1020, along with the notches and teeth ring 1025, threadbore 1028, lined by threads 1024. FIG. 3C shows a cross section of nut body 1020 along line 3-3 of FIG. 3B. FIG. 3C shows nut body 1020, with external locking serration rings 1025 and rotation rings 1026. Fastener nut body 1020 is threaded, as shown in FIG. 3C, with STI threads 1024 and the thread bore 1028 is provided with a helical insert 1030 that occupies the threads of the fastener. Fastener nut body 1022 thread bore 1028 is shown filled by HTI 1030. Helical insert 1030 may be selected from a wide range of available helical inserts to occupy the depth of thread bore 1028. HTI 1030 can be either a prevailing torque insert (as shown) or free running. An installed HTI can be held in position by a retainer, as shown by detents 1032.

Figure 4:
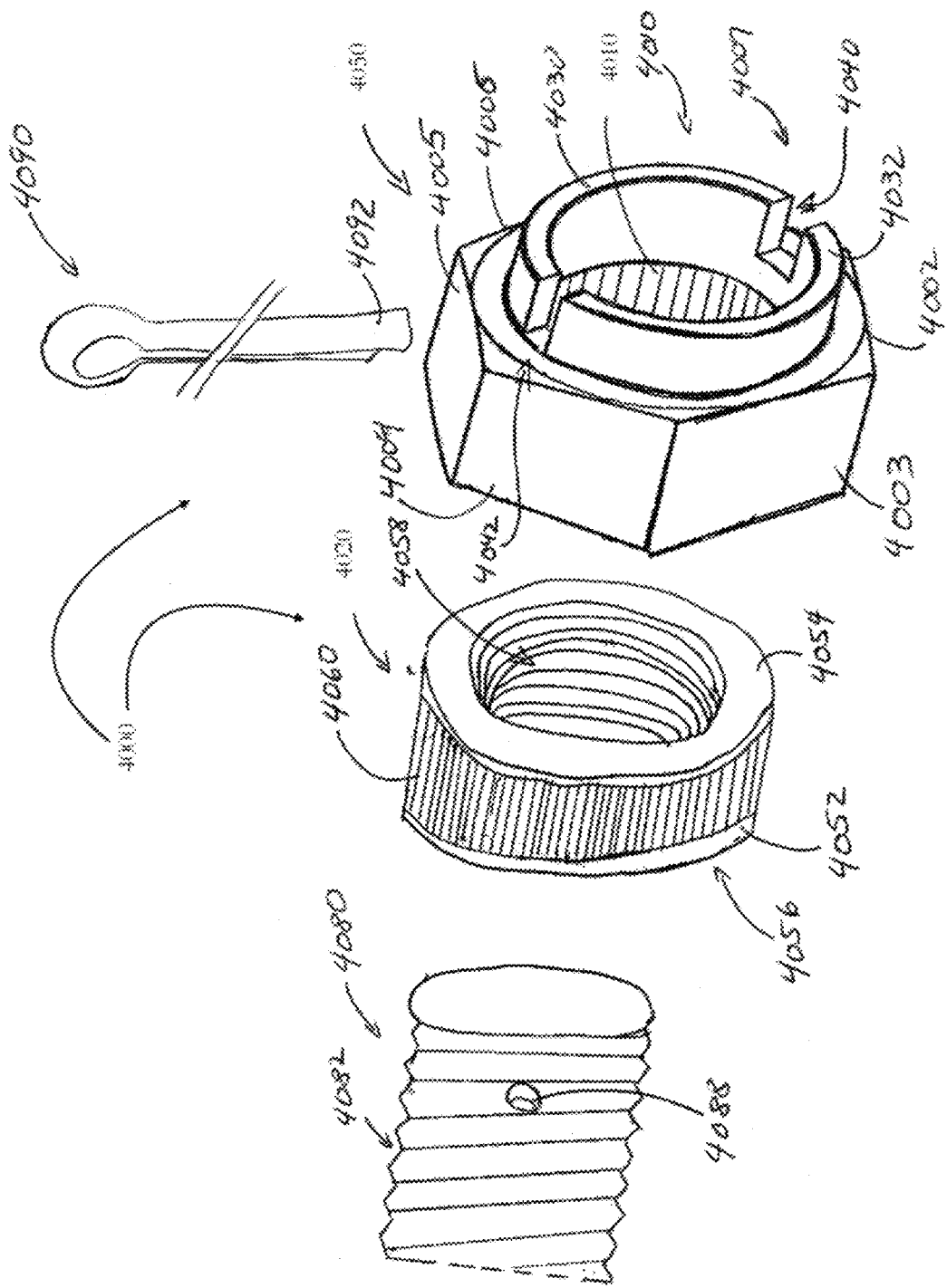
FIG. 4 shows a perspective view of a serrated cap, and compatible fastener for a serrated locking fastener.

FIG. 4 shows an exploded perspective view of the set of components utilized with the disclosed system. Fastener 4000 is comprised of is a compatibly serrated removable cap 4050 for use with a version of the fastener, as threaded locknut nut 4020. (See also fastener 1000 of FIG. 1). Cap 4050 has an externally hexagonal shape as is common for machine nuts, with faces 4002-4007. Cap 4050 is formed with a bore 4010. Bore 4010 is formed with vertical internal serrations 4040. Bore 4010 also has tab extensions 4030 with lock slots 4042, 4044 between tabs 4030.

Nut 4020 is externally serrated, as at 4060, and externally compatible with cap 4050, and is internally threaded to be compatible with a mounting shaft, such as shaft 4080, or with a bolt or stud. A distal bearing face 4056 bordered by clear ring 4052 will bear against a surface associated with shaft 4080 (or with a pulley, or support brace, for instance) and proximal bearing face 4054 bears against the inside of cap 4000.

Threads 4058 of nut 4020 are compatible with threads 4082 on shaft 4080. Shaft 4080 is also provided with a cross bore, such as bore 4088, so that a lock can be passed through the shaft to lock it into place. In order to lock the shaft and fastener, the fastener 4000 (of nut 4020 and cap 4050) is driven onto shaft 4080, and tightened to a specified torque. The cap 4050 is then slipped off the nut 1020, and the cross bore 4088 is aligned with the lock slots (i.e. 4040) on the cap. As shown in FIG. 4, two lock slots 4040 and 4044 are provided. Those skilled in the art will recognize that 4 or more lock slots are considered useful for particular applications, and are in keeping with the present disclosure. Following proper torque application, a pin or otherwise compatible lock or wire lock, such as the pin end 4092 of cotter pin 4090, can fit through the aligned lock slot 4040, pass through aligned bore 4088 and lock slot 4042, lock the cap in place, relative to the fastener and the shaft.

The internal serration effective diameter of cap 4050 will match the external serration effective diameter of nut 4020 such that cap 4050 will fit over nut 4020 with sufficient clearance between serrations 4010 on the cap and serrations 4060 on the nut 4020 to allow for ease of installation, and removal. Tolerance is minimized to prevent advancement over the serrations. In one embodiment of the disclosure, cap 4050 is placed over nut 4020 and used installed together, to thread, wrench, and properly torque fastener 4000. Cap 4050 is then removed and remounted to properly align slots 4040 with a keyhole in the shaft 4080 onto which fastener 4000 is threaded. Cotter pin 4090 is then inserted through slots 4040, the keyhole bore 4088 in the shaft, and then slots 4042 (for instance) on the opposite side of cap 4050. Thus, a precise torque can be imposed on the nut, and the torqued nut need not be advanced or loosened in order to add a positive lock. Previous positive locking nut cap combinations do not allow for application of a precise torque because the locking crennelations seldom are coincident with the specified torque position.

For certain applications, two pin slots are desired. In other applications, 4, 6 or 12 slots may be desirable, with a limit to the number of slots reached when the tabs are no longer sufficiently robust to limit the reverse torque that may be applied to the mounted fastener.

Figures 5A, 5B:
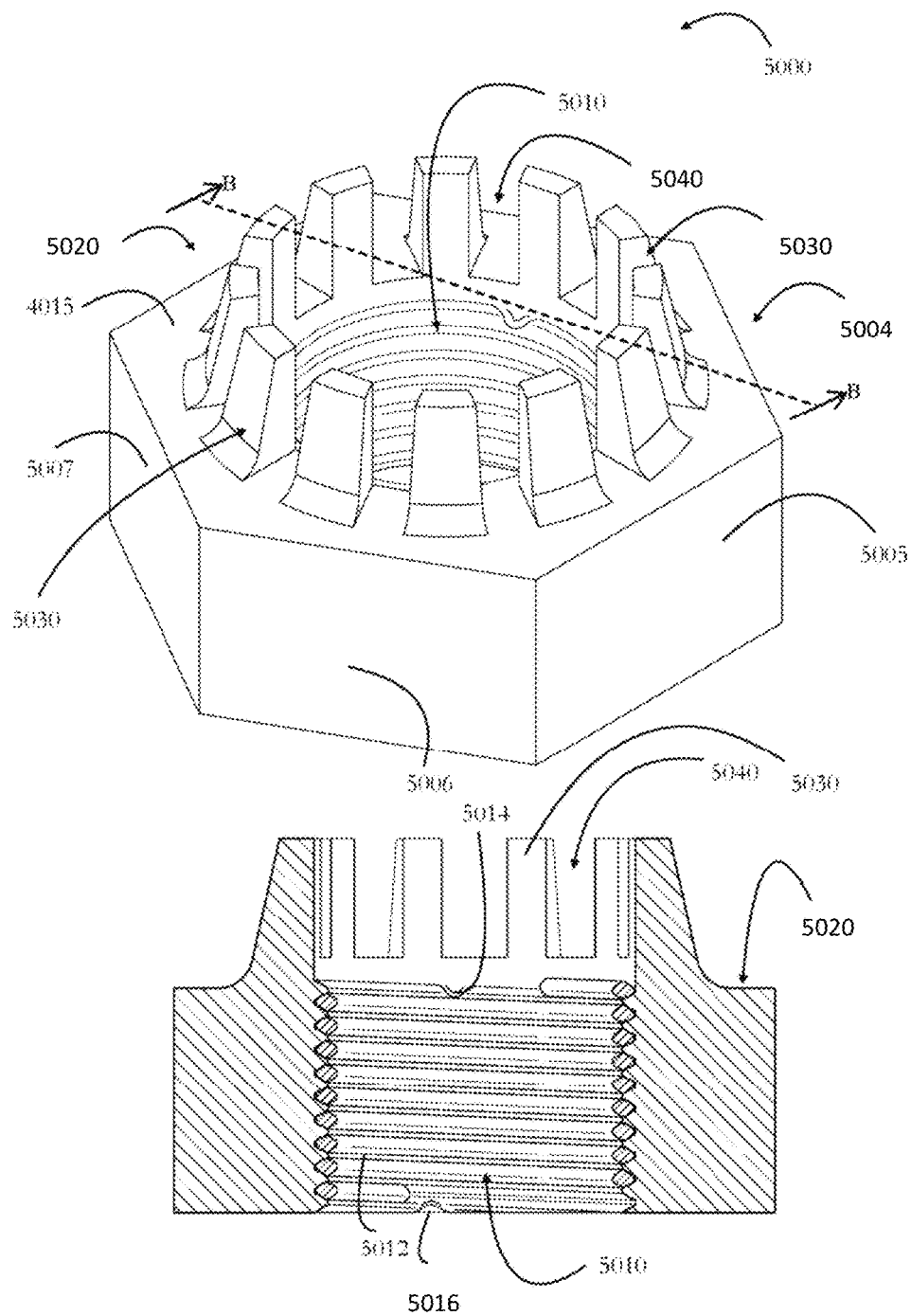
FIG. 5A shows view of an alternative castellated nut for a positive locking fastener.
FIG. 5B shows a cross-sectional view of a castellated nut for a positive locking fastener.
Figure 5C:
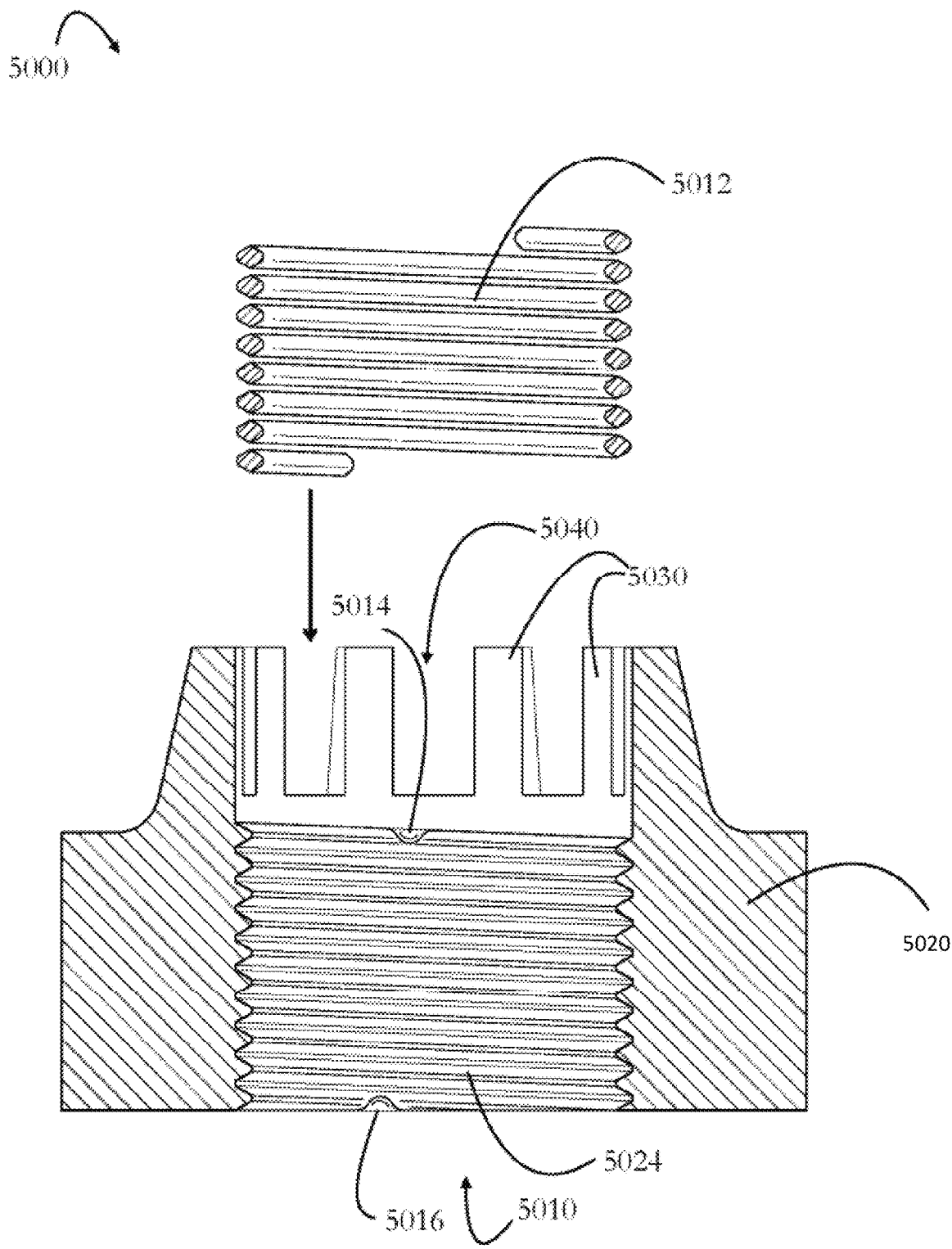
FIG. 5C shows an exploded cross-sectional view of a castellated nut for a positive locking fastener.

FIG. 5 shows views of an alternative embodiment fastener 5000 without a separate serrated removable cap as shown in regards to fastener 1000 of FIG. 1. FIG. 5A shows a tip perspective view, FIG. 5B shows a cross section through plane 8-8, and FIG. 5C shows an exploded cross section. Fastener 5000 has an externally hexagonal shape as is common for machine nuts, with faces 5002-5007. Again, those skilled in the art will recognize that other nut shapes are applicable to the disclosure. Fastener 5000 is formed of nut body 5020 with a bore 5010. Bore 5010 of nut body 5020 also has tab extensions 5030 with slots between tabs 5040 though which a cotter pin or retaining wire can fit. Tab extensions 5030 are formed as part of the nut body, and must be strong enough to resist a nominal reverse torque to safely lock the fastener in place when a key, pin or wire is installed. As shown in FIG. 5, twelve tab extensions are provided, and tab extensions alone are preferably twelve, sixteen or eighteen in number, and should be aligned in an opposite manner so that a pin can pass straight through a slot, a cross bore and an opposite slot.

The internal threads of fastener 5000 can be formed to be compatible with a helical thread insert, such as HTI insert 5012. Insert 5012 is shown as a free running insert, and may be trapped in the threadbare 5010 by thread perturbations, such as detents 5014, 5016. As in FIG. 4, a cotter pin can be inserted through slots 5040, the keyhole in the shaft, and then an opposite slot on the opposing side of fastener 5000. Thus, the nut is precisely torqued and then locked in place.

Existing locking fasteners are often characterized as either "positive locking" or a "prevailing torque" locking fastener. In a positive locking fastener, the threaded on portion of the fastener, typically a nut, is mechanically held in its prescribed position by some type of mechanical locking feature. As shown above, or the nut to be released, or backed off from its specified final position, in a positive locking fastener, some mechanical failure must occur, such as shearing of metal, or displacement of retainer pin.

A prevailing torque mechanical fastener utilizes a specified torque or opposed frictional force to lock the fastener in place. Plastic inserts, such as a Vespel insert in a nut, offset locking washers, or crimped deformation fasteners are common examples of prevailing torque locking fasteners. As disclosed herein, the helical insert functions as a prevailing torque locking fastener. It can also be combined to add a positive lock as shown. Such lock can be a cotter pin or alternatively a lock or wire.

FIG. 6 shows cross sections to demonstrate the retained cap embodiment for use with a fastener such as fastener 1000 of FIG. 1. Cap 1042 has an externally hexagonal shape. Cap 1042 is formed with bore and formed with vertical serrations 1035, and clearance rings 1036. Bore 5010 also has twelve tab extensions 1040 with slots 1044 between tabs 1040 though which a retaining pin can fit.

Figure 6A:
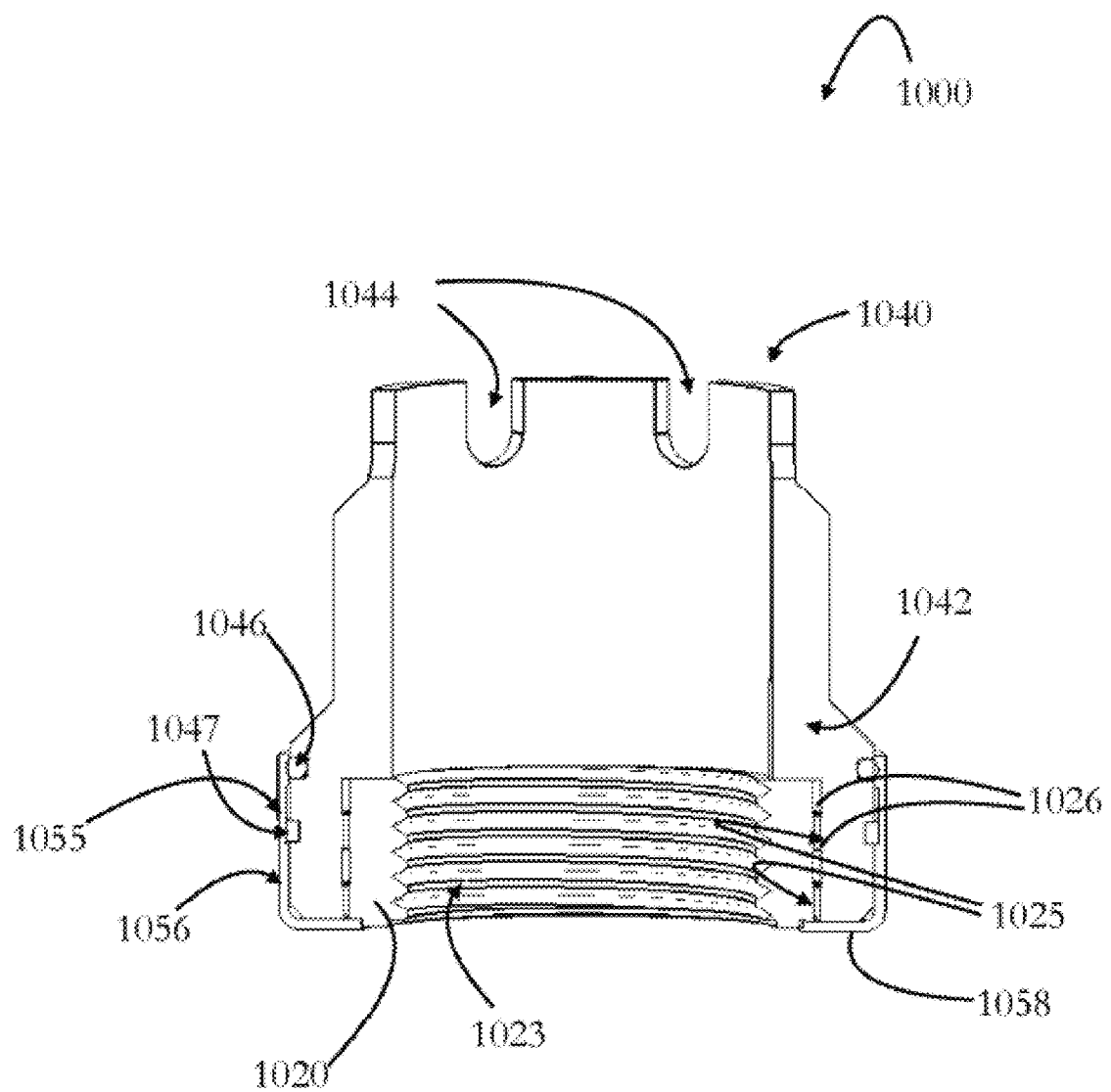
FIG. 6A shows a cross-sectional view of the components of a precise torque control fastener.
Figure 6B:
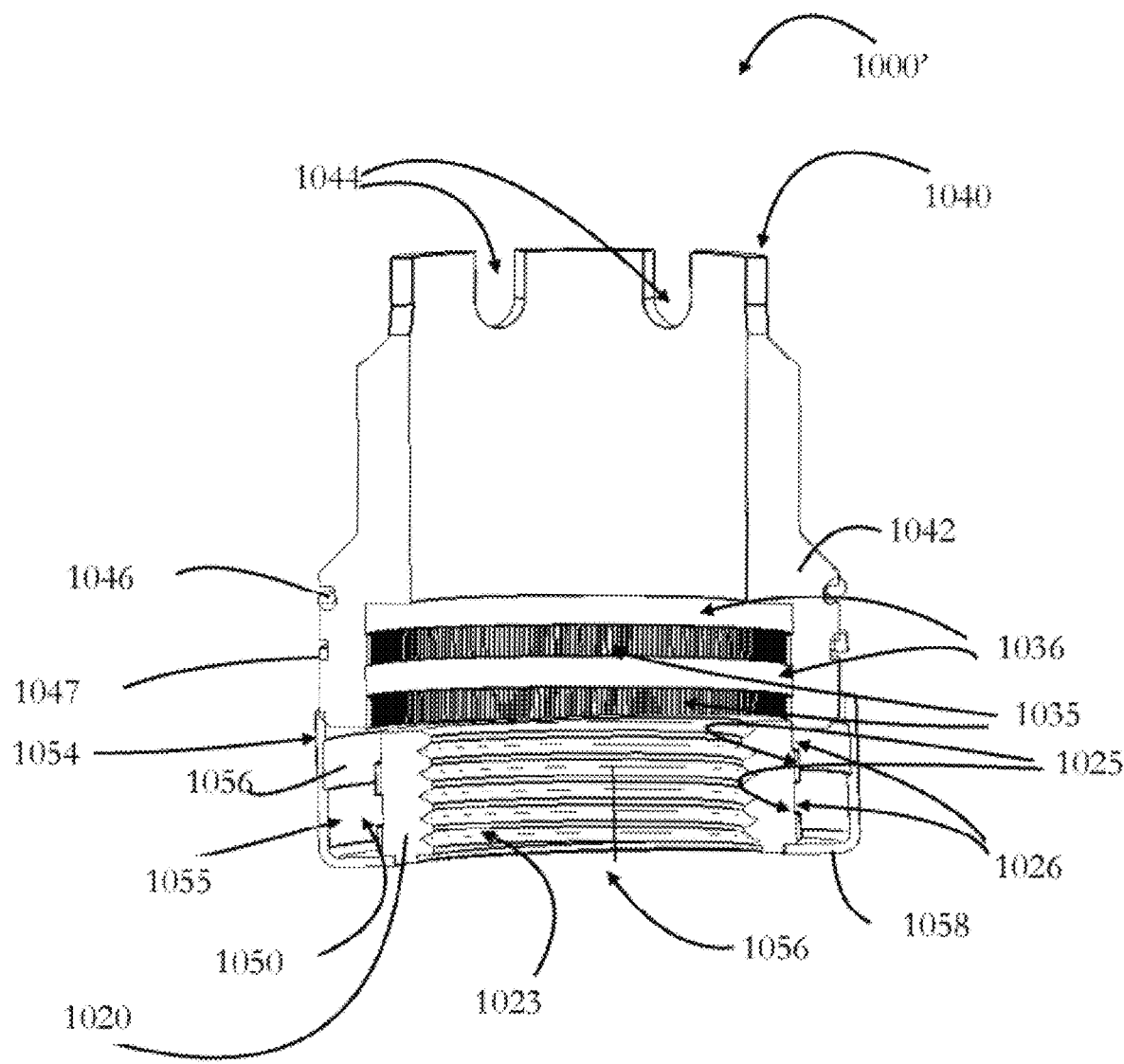
FIG. 6B shows an exploded cross-sectional view of the components of a precise torque control fastener.

FIG. 6A shows a cross section of the components of the precise torque control locking fastener with the cap 1042 of the fastener seated on the nut body, so that the serrations are engaged. FIG. 6B shows the fastener 1000', with the cap retracted, releasing the cap for rotation relative to the nut 1020. Retainer 1058 can be implemented to prevent the cap from separating from the nut body, limiting the possibility of foreign object damage when a part is separated. Gasket 1046, along with ring 1047 are formed to limit passage of lip 1054. Clear space 1056, along with land 1055 allow the cap 1040 to rotate while being retained by retainer 1058.

Another existing type of locking nut fastener comprises a nut that has been provided with a thread barrel that is a shape other than round, in particular, an oval thread barrel. One current method of creating an oval thread barrel is to distort, or "crimp" a circular cross section nut barrel to a specified torque, distorting the round cross section to an oval cross section. Such crimped fasteners can function as a prevailing torque locking fastener, but have a number of limitations. These limitations include the difficulty in starting the crimped nut on the thread of a bolt, due to the distortion of the circular cross section. Nuts which are crimped at the time of use may be essentially destroyed by improper or over crimping. Furthermore, it is difficult to reproducibly create a desired fastener that performs within a narrow desired range of prevailing torque. In these fasteners, the amount of back-off resistance (i.e. the prevailing torque of the fastener) is difficult to control and lacks consistency between different lots of crimped fasteners, and between installation events or between different technician installers. See for instance, Barrett, R. T., "Fastener Design Manual," NASA Reference Publication 1228, March 1990.

Another type crimped fastener utilizes three-point crimping (usually used on a larger sizes of nuts). Theoretically more points for crimping are possible (for example four or more).

It is a further embodiment of the disclosed apparatus or device is use of a helical insert as a locking feature for female self-locking fasteners in lieu of other traditional methods such as crimping (oval and three or more point) in order to deliver more consistent torque performance of the fasteners within the specimens of a given production batch. Such use of the new system provides for a reduced scrap rate of fasteners, better maintainability of installed fasteners, and less risk of material performance issues such as micro crack or hydrogen embrittlement for instance. Implementation of the disclosure allows for the elimination negative production issues, such as double crimping, unnecessary additional sorting or the like.

The helical wire insert of the current disclosure can be a full substitute for crimped locking fasteners, and minimize the existing problems with starting the fastener on a threaded shaft caused by the tolerances resulting from crimping of the fastener into an oval shape.

A further embodiment of the disclosure is the use of helical locking inserts in applications that require high strength fasteners, such as 220 KSI 12 point nuts. In substituting for the six point fastener shown in FIG. 1, a 12 point nut can be provided with a helical coil insert that nests within a provided coil pocket of the thread barrel. FIG. 4 shows a perspective view of the helical insert locking nut 4000, with the nut body 4015 formed as a six sided nut with six driving faces 4002-4007. It will be apparent to those skilled in the art that a variety of other shapes of driving faces can be provided, such as 8, 12, or some other variation from a regular polygonal shape.

Figure 7A:
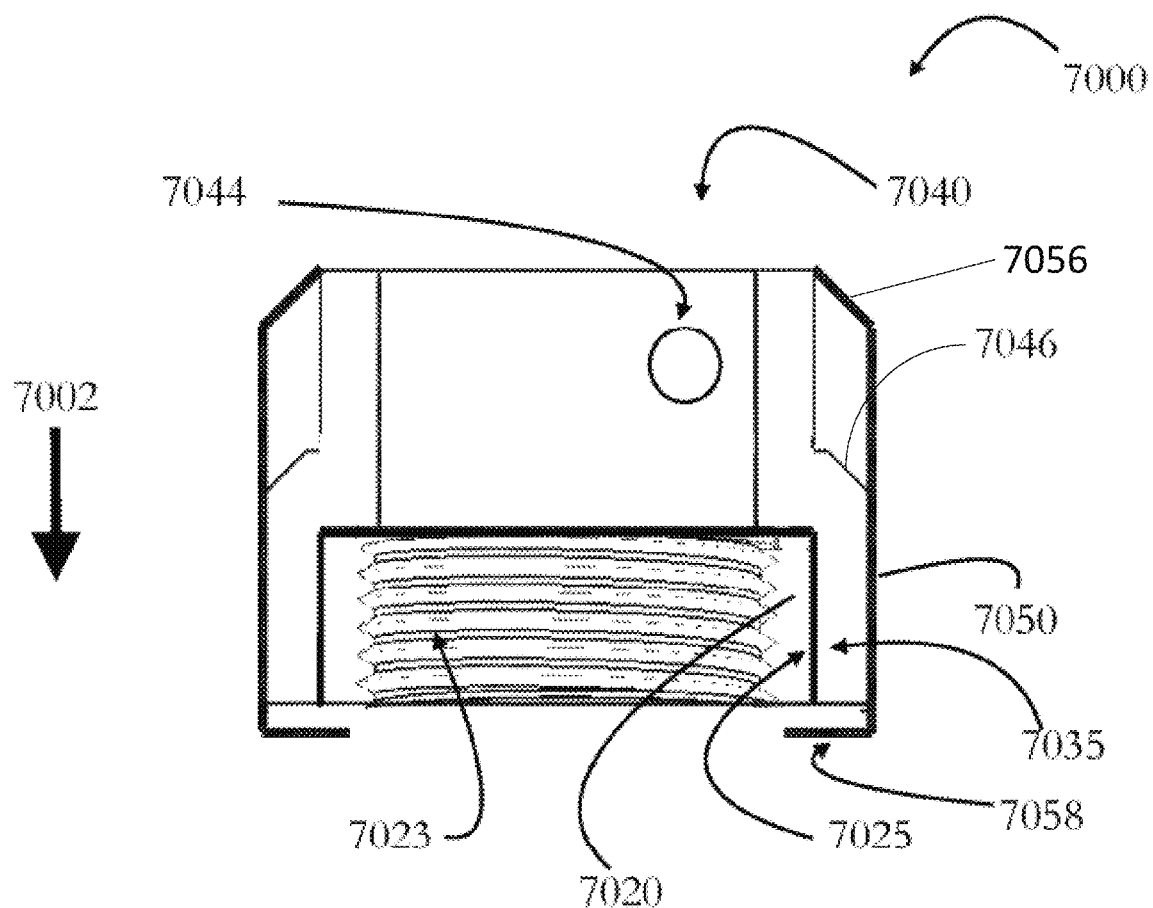
FIG. 7A shows a cross-sectional view of an alternative embodiment of a precise torque control fastener.

FIG. 7 shows an alternate embodiment of the torque control locking nut. In FIG. 7, PTC locking nut 7000 is comprised of three primary structural components, nut body 7020, lock cap 7040, and retainer 7050. Nut body 7020 is an internally threaded (as at 7023) hollow cylinder, and is configured with external serrations generally at 7025. The nut body surrounds and generally defines bore 7030, with said bore accommodating a shaft, such as an externally threaded shaft compatible with threads 7023.

Lock cap 7010 has a sleeve portion 7040 and a seat body 7046, with internal serrations 7035. Internal serrations 7035 mate in a nesting fashion with the external serrations 7025 of nut body 7020. Said serrations do not necessarily have an identically compatible structure, but must allow for slidable engagement of the compatible serrations. Nut body serrations 7025 may number 24 or 48 individual teeth, proportionally arrayed about the out surface of the nut body. The internal serrations of the lock cap thus must be compatibly arranged, for instance with 48 or 96 proportionally arrayed individual teeth. In such a manner, either the nut body or the cap could be provided with more teeth to allow very fine control over the positioning of a nut about a threaded shaft, while not sacrificing overall locking nut strength.

Lock cap sleeve portion 7040 is provided with a cross bore 7044 which allows for insertion of a locking pin, such as a Cotter key, retaining wire or the like. As previously described, insertion of a threaded shaft into bore 7010 allows the lock cap to be threaded onto the shaft generally longitudinally to arrow 7002 in FIG. 7A, with the nut body freely advancing until the nut body seat 7060 is in contact with a bearing surface (as at 7062), whereupon the torque required to advance the nut body along a shaft increases. With the lock cap 7040 engaged about the serrations mating between the nut body 7020, the fastener can be advanced until a precise predetermined torque specification is reached. There is no immediate need to align the cross bore 7044 with a compatible cross bore in the inserted shaft. (Refer to the disclosure in relation to FIG. 5) Once the predetermined torque is reached, the lock cap 7040 is retracted from engagement with the serrations on nut body 7020 by retracting the lock cap in the direction of arrow 7004. Because the nut body 7020 is fully seated and torqued to specification, the nut body remains in place and the lock cap and nut body separate from one another.

Figure 7B:
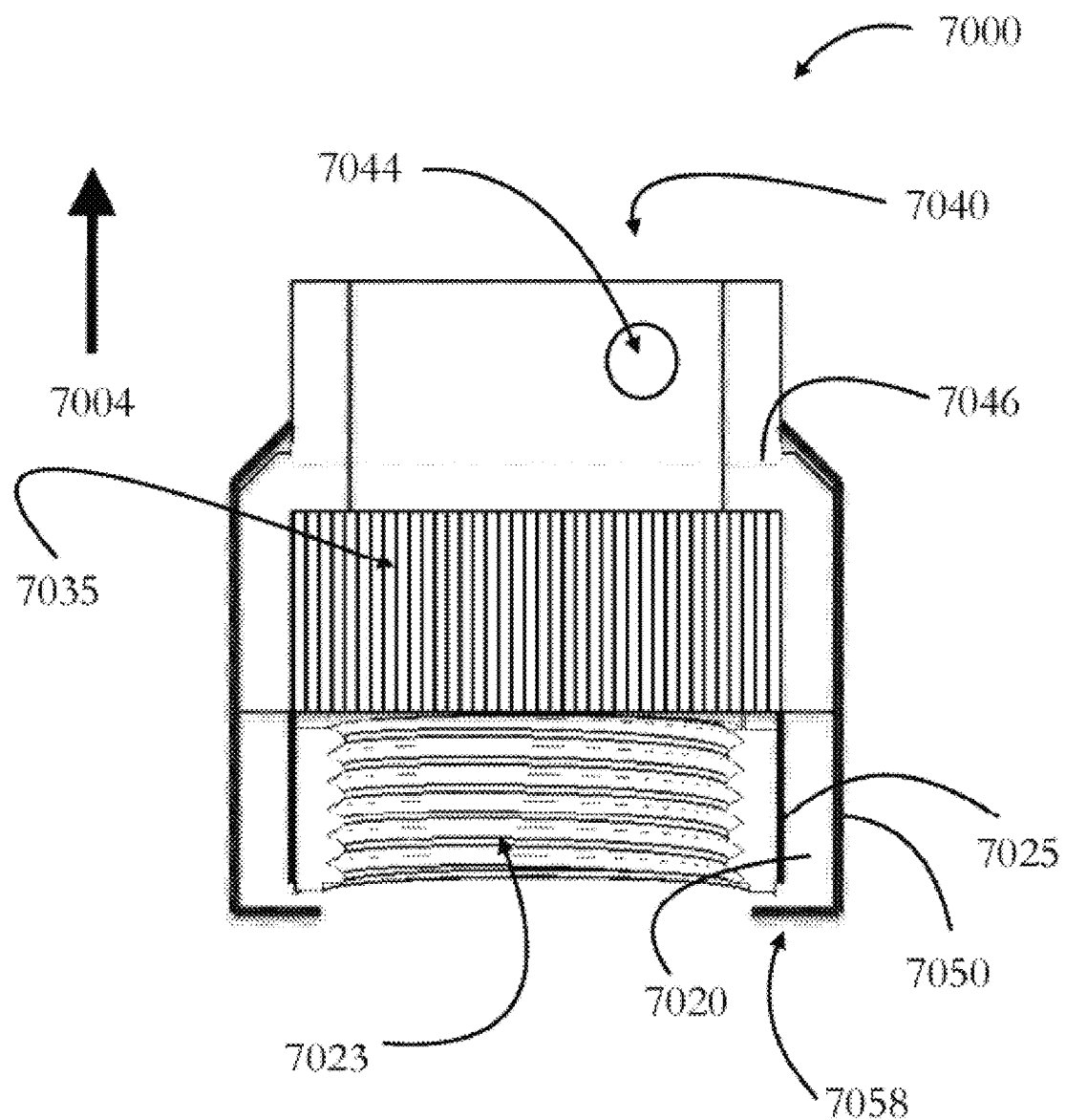
FIG. 7B shows a cross-sectional view of an alternative embodiment of a precise torque control fastener.

As shown in FIG. 7B the lock cap 7040, and the lock cap can be rotated about the shaft axis 7080 until the lock cap cross bore aligns with a cross bore in the inserted shaft (see arrow 7082). When the shaft cross bore and the lock cap cross bore align, the lock cap is advanced in the direction of arrow 7002, engaging the serrations 7025 and 7035. Once the locking pin is inserted and secured, the fastener 7000 is held at precisely the predetermined torque until such time as the locking pin is removed and the fastener is counter rotated.

The third component of the PTC locking nut 7000 is retaining collar 7050. Retaining collar 7050 retains the lock cap 7040 and nut body 7020 in association with one another. When lock cap 7040 is urged in the direction of arrow 7002, the nut body 7020 nests within the seat body of lock cap 7040. When the lock cap is withdrawn from association with nut body 7020, by moving the lock cap in the direction of arrow 7004, the retaining collar 7050 allows disengagement of the nut body and lock cap. As the disengagement occurs, the withdrawing lock cap 7040 is prevented from full separation from the nut body 7020 by the lock cap shoulder 7046 encountering the retaining collar shoulder 7056. Retaining collar 7050 is further retained in association with the nut body and the lock cap by retaining collar heel 7058, which is concentrically circumferential with the bore, the nut body and the lock cap.

In yet another embodiment of the present disclosure, the helical insert can be utilized with barrel nuts. Barrel nuts are widely used in attaching equipment to an aircraft fuselage. In particular, aircraft jet engines are often attached to the airframe with barrel nuts that include a locking feature. In another example, isolator mounts are produced by the Lord Corporation of Cary, N.C. In addition, the same or similar fasteners are used in a variety of situations, such as industrial equipment, farm equipment and other equipment where vibration and motion control is required.

These current systems are generally unacceptable because of the expense of the locking inserts and difficulty in installing the locking Vespel insert. An additional difficulty in using such inserts is the need for the bolt fasteners driven into the insert to maintain the specified torque tolerance when in use in an environment that imposes a wide range of temperatures and vibration patterns. As such a locking mechanism is considered important. Currently, the only effective locking or retaining system available for floating inserts is a collar made of resilient material, such as Dupont Vespel™.

Insertion of a threaded male fastener into the compressed helical insert will cause the spring nature of the compressed insert to resist the anti-rotation of the inserted fastener. Selection of appropriate threads and wire insert can be used to meet particular torque specifications.

It should be recognized that the fasteners system disclosed is applicable to a method of attaching components by providing a fastener that includes a thread bore internally threaded to accept a helical wire insert, inserting a helical wire insert with an external thread that mates with the internal threads of the thread bore, and internal threads of the insert that are compatible with an externally threaded bolt and capable of being driven by a given torque into the helical wire insert, with the helical wire insert resisting the backing out of the driven insert with a torque greater that the given torque for driving the threaded shaft into the helical wire insert.

Additional benefits and features of the fastener system will be apparent to those skilled in the art.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above system without departing from the scope of the invention herein involved, it is intended that all matter contained in the above descriptions and examples or shown in the accompanying drawings shall be interpreted as illustrative and not in a limiting sense. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

The invention claimed is:

1. A combination positive locking and prevailing torque fastener system, comprising:

a fastener nut having a nut proximal end and a nut distal end, a nut bore extending from the nut proximal end into the fastener nut and defining a nut bore axis, a plurality of nut bore threads on at least a portion of the nut bore, and a nut exterior surface having a plurality of nut serrations parallel to the bore axis;

a helical wire insert formed to create a plurality of insert external threads and a plurality of insert internal threads, wherein a portion of the insert external threads mate with a portion of the nut bore threads in a portion of the nut bore and engage the fastener nut;

a nut cap having a cap proximal end and a cap distal end, a nut cap bore extending from the cap proximal end and defining a nut cap bore axis and a nut cap bore interior surface having a plurality of nut cap serrations parallel to the cap bore axis, a nut cap exterior surface having a tool interface portion, and at least two notches extending from the cap distal end toward the cap proximal end, wherein the nut cap bore is sized to receive at least a portion of the fastener nut;

a cap retainer having a retainer proximal end and a retainer distal end, whereby the cap retainer receives at least a portion of the fastener nut and engages the nut cap, the cap retainer prevents the fastener nut from exiting the retainer proximal end, and the cap retainer engages the nut cap to (a) allow longitudinal movement from the engaged position to the disengaged position, (b) allow rotation of the nut cap relative to the cap retainer, and (c) secure the nut cap to the cap retainer and thereby confine the fastener nut;

a shaft having a cross bore and a plurality of shaft threads that mate with a portion of the insert internal threads such that an insertion torque is required to create relative movement between the shaft threads and the insert internal threads in a first direction, and a removal torque is required to create relative movement between the shaft threads and the insert internal threads in a second direction opposite the first direction; and a pin sized to pass through the cross bore and the at least two notches;

wherein the nut cap is longitudinally movable from an engaged position to a disengaged position such that in the engaged position the plurality of nut cap serrations cooperate with the plurality of nut serrations so that the fastener nut and the nut cap are rotationally locked, and in the disengaged position the plurality of nut cap serrations are separated from the plurality of nut cap serrations so that the nut cap rotates independent of the fastener nut to align at least two notches with the cross bore and allow the pin to pass through the cross bore and the two notches to thereby prevent relative movement of the fastener nut and the shaft.

2. The fastener system of claim 1, wherein the plurality of nut serrations include a first ring of nut serrations and a second ring of nut serrations, the first ring of nut serrations separated from the second ring of nut serrations by a non-serrated nut surface, and wherein the plurality of nut cap serrations include a first ring of nut cap serrations and a second ring of nut cap serrations, the first ring of nut cap serrations separated from the second ring of nut cap serrations by a non-serrated nut cap surface.

3. The fastener system of claim 1, wherein the nut cap includes at least four notches extending from the cap distal end toward the cap proximal end.

4. The fastener system of claim 1, wherein at least a portion of the nut cap exterior surface includes a nut cap recess that receives a portion of a gasket that engages the cap retainer.

5. The fastener system of claim 1, wherein the entire fastener nut is received within the cap retainer, and a portion of the nut cap is received within the cap retainer.

6. The fastener system of claim 1, wherein the fastener nut includes at least one insert retainer to limit the movement of the helical wire insert within the nut bore.

7. The fastener system of claim 1, wherein the plurality of nut serrations are uniformly spaced 1-5 mm apart, and the plurality of nut cap serrations are uniformly spaced 1-5 mm apart.

8. The fastener system of claim 1, wherein the helical wire insert has a tensile strength of at least 200,000 psi.

9. The fastener system of claim 8, wherein the helical wire insert has a Rockwell C hardness of 43-50 RWC.

10. The fastener system of claim 9, wherein the fastener nut has a tensile strength of at least 220,000 psi.

11. A combination positive locking and prevailing torque fastener system, comprising:

a fastener nut having a nut proximal end and a nut distal end, a nut bore extending from the nut proximal end into the fastener nut and defining a nut bore axis, a plurality of nut bore threads on at least a portion of the nut bore, and a nut exterior surface having a plurality of nut serrations parallel to the bore axis;

a helical wire insert formed to create a plurality of insert external threads and a plurality of insert internal threads, wherein a portion of the insert external threads mate with a portion of the nut bore threads in a portion of the nut bore and engage the fastener nut, and the helical wire insert has a tensile strength of at least 200,000 psi and a Rockwell C hardness of 43-50 RWC;

a nut cap having a cap proximal end and a cap distal end, a nut cap bore extending from the cap proximal end and defining a nut cap bore axis and a nut cap bore interior surface having a plurality of nut cap serrations parallel to the cap bore axis, a nut cap exterior surface having a tool interface portion, and at least four notches extending from the cap distal end toward the cap proximal end, wherein the nut cap bore is sized to receive at least a portion of the fastener nut;

a cap retainer having a retainer proximal end and a retainer distal end, whereby the cap retainer receives at least a portion of the fastener nut and engages the nut cap;

a shaft having a cross bore and a plurality of shaft threads that mate with a portion of the insert internal threads such that an insertion torque is required to create relative movement between the shaft threads and the insert internal threads in a first direction, and a removal torque is required to create relative movement between the shaft threads and the insert internal threads in a second direction opposite the first direction; and a pin sized to pass through the cross bore and at least two notches;

wherein the nut cap is longitudinally movable from an engaged position to a disengaged position such that in the engaged position the plurality of nut cap serrations cooperate with the plurality of nut serrations so that the fastener nut and the nut cap are rotationally locked, and in the disengaged position the plurality of nut cap serrations are separated from the plurality of nut cap serrations so that the nut cap rotates independent of the fastener nut to align at least two notches with the cross bore and allow the pin to pass through the cross bore and the two notches to thereby prevent relative movement of the fastener nut and the shaft; and wherein the cap retainer prevents the fastener nut from exiting the retainer proximal end, and the cap retainer engages the nut cap to (a) allow longitudinal movement from the engaged position to the disengaged position, (b) allow rotation of the nut cap relative to the cap retainer, and (c) secure the nut cap to the cap retainer and thereby confine the fastener nut.

12. The fastener system of claim 11, wherein the plurality of nut serrations include a first ring of nut serrations and a second ring of nut serrations, the first ring of nut serrations separated from the second ring of nut serrations by a non-serrated nut surface, and wherein the plurality of nut cap serrations include a first ring of nut cap serrations and a second ring of nut cap serrations, the first ring of nut cap serrations separated from the second ring of nut cap serrations by a non-serrated nut cap surface.

13. The fastener system of claim 11, wherein at least a portion of the nut cap exterior surface includes a nut cap recess that receives a portion of a gasket that engages the cap retainer.

14. The fastener system of claim 11, wherein the entire fastener nut is received within the cap retainer, and a portion of the nut cap is received within the cap retainer.

15. The fastener system of claim 11, wherein the plurality of nut serrations are uniformly spaced 1-5 mm apart, and the plurality of nut cap serrations are uniformly spaced 1-5 mm apart.

16. The fastener system of claim 11, wherein the fastener nut has a tensile strength greater than the helical wire insert tensile strength.

* * * * *